United States Patent [19]
Stein

[11] Patent Number: 5,040,207
[45] Date of Patent: Aug. 13, 1991

[54] TWO-TELEPHONE INTERCOM

[76] Inventor: Buckminster G. Stein, 209 Larkspur La., Wake Village, Tex. 75501

[21] Appl. No.: 577,277

[22] Filed: Sep. 4, 1990

[51] Int. Cl.⁵ .................... H04M 9/02; H04M 19/02
[52] U.S. Cl. .................................... 379/167; 379/176
[58] Field of Search .................. 379/167, 159, 176

[56] References Cited
U.S. PATENT DOCUMENTS

| | | |
|---|---|---|
| 2,855,461 | 10/1958 | Bernstein . |
| 4,001,506 | 1/1977 | Brandstatter . |
| 4,096,358 | 6/1978 | Bidlack et al. . |
| 4,196,317 | 4/1980 | Bartelink . |
| 4,588,859 | 5/1986 | Liberman . |
| 4,636,585 | 1/1987 | Brandstätter ........................ 379/167 |
| 4,636,589 | 1/1987 | Lee . |
| 4,821,319 | 4/1989 | Middleton et al. . |

Primary Examiner—Stafford D. Schreyer
Attorney, Agent, or Firm—Eugene Stephens & Associates

[57] ABSTRACT

A two-telephone intercom has a simple station-call signalling system. In the preferred embodiment, each telephone is provided with its own respective signalling unit comprising (a) a dc voltage source, (b) a voltage-sensitive threshold element (preferably, a zener diode), and (c) a signalling device, e.g., a beeper and/or flashing light. Whenever one of the telephones is activated (i.e., taken off hook), the signalling device associated with the other telephone becomes operative and remains operative until the other telephone is answered (i.e., activated) or until the first telephone is hung up. Three embodiments of the signalling-unit circuits are disclosed.

16 Claims, 1 Drawing Sheet

TWO-TELEPHONE INTERCOM

TECHNICAL FIELD

This invention relates to a telephone intercom and, more particularly, to an intercom comprising two battery-powered telephones interconnected by a single pair of wires.

BACKGROUND

Two-telephone intercoms are well known. The two telephones are often connected in series with a dc power source, i.e., a battery. Such intercom circuits sometimes include buzzer arrangements for ringing the opposite telephone; and these buzzer arrangements usually include at least one "ringing" switch, which must be operated by the calling party, the buzzer of the second telephone being operated only as long as the buzzer switch at the first unit is held in its closed position.

This invention greatly simplifies the signalling circuit used to call the second telephone.

SUMMARY OF THE INVENTION

The invention comprises a remarkably simple station-call signalling system in which, when one of the telephones is activated by being taken off hook, the signalling device (e.g., a flashing light or beeper) of the other telephone automatically becomes operative. The signalling circuit comprises a signalling device and a voltage-sensitive threshold element which, in the preferred embodiment, is merely a zener diode. This circuit is placed across the pair of lines interconnecting the telephones, i.e., in parallel with its associated telephone, and is positioned between the telephone and its dc power supply. A similar signalling circuit is similarly positioned relative to the second telephone, namely, in parallel with the other telephone and between the second telephone and its associated dc power supply. When either of the telephones is activated by being taken off hook, this effectively places both dc power sources in series with the other telephone's signalling circuit and provides a sufficient voltage drop over the threshold element (e.g., the zener diode) associated with the other telephone to cause it to conduct, thereby drawing current through and operating the signalling device of the other telephone. The signalling device continues to operate until the other telephone is answered, or until the first telephone is deactivated by being hung up.

DRAWINGS

DETAILED DESCRIPTION

Figure 1:
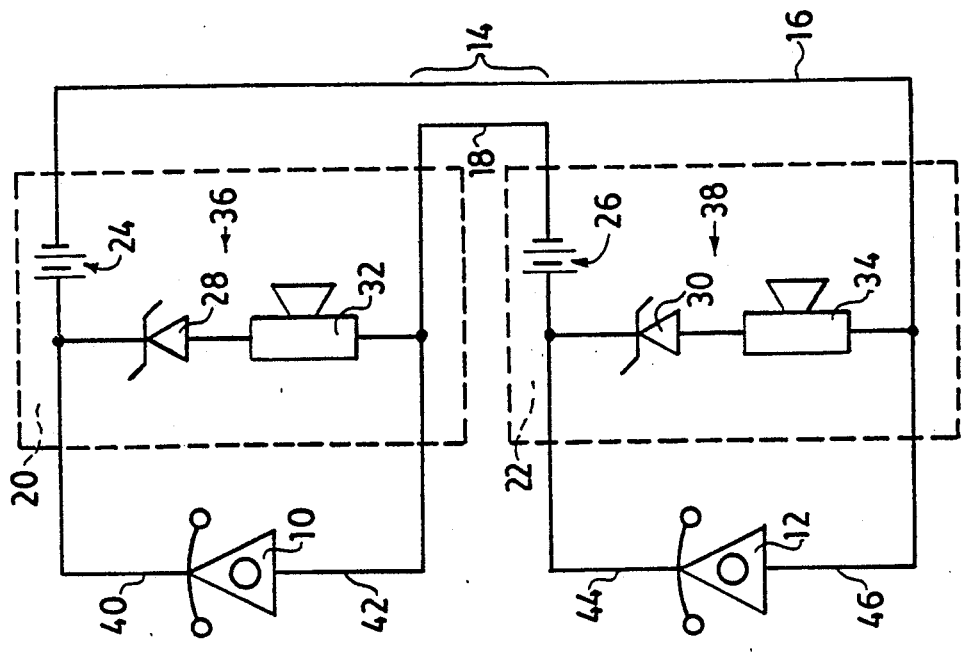
FIG. 1 is a schematic circuit diagram of the telephone intercom according to the invention.

Referring to FIG. 1, a pair of standard telephones 10 and 12 are connected in series by a double-wire conductor 14 comprising the connecting wires 16 and 18. Telephones 10 and 12 are preferably conventional phones of approximately equal impedance.

A pair of physically-compact signal units 20 and 22 are associated with each of the respective telephones, being positioned between the associated telephone and the interconnecting conductor 14. The length of conductor 14, and the distance between the telephones, is only limited by the resistance, inter-wire capacitance, etc. of conductor 14.

In the preferred embodiment, each signalling unit includes a dc power source, e.g., a 9-volt battery, in series between its associated telephone and one of the connecting wires. Namely, battery 24 of signal unit 20 is in series between connecting wire 16 and telephone 10, while battery 26 of signal unit 22 is in series between connecting wire 18 and telephone 12.

Each of the signalling units also includes a signalling circuit 36, 38 comprising a respective voltage-sensitive threshold element and a respective signalling device. The threshold element may comprise any circuitry or combination of electronic components which becomes conductive only when a voltage of predetermined magnitude is applied across it, e.g., a varistor, diodes in series, etc. In the preferred embodiments illustrated in the drawings, the threshold elements comprise zener diodes 28, 30 and the respective signalling devices are buzzers or beepers 32, 34. Of course, the signalling device could include a flashing light in place of, or in addition to (e.g., in parallel with), beepers 32, 34. Each of these respective signalling circuits is connected across the wires connecting the two telephones, thereby placing each respective signalling circuit in parallel with its associated telephone.

The threshold voltage for each signalling circuit is selected to be greater than one-half the total dc voltage in series with both phones, but less than the total voltage. For instance, in the preferred embodiment in which each signalling unit includes its own 9-volt battery, the total dc voltage in series with both phones is 18 volts. Therefore, in the preferred embodiment, each zener diode 28, 30 is selected so that its junction breakdown voltage is about 12 volts (i.e., greater than 9 volts but less than 18 volts), and so each of these threshold elements acts, effectively, as an open dc circuit until the threshold voltage is placed across its respective terminals.

The operation of this circuit is as follows: when both telephones are on hook (i.e., deactivated so that each is an open dc circuit), batteries 24 and 26 and their associated signalling circuits 36, 38 are all in series. Each zener diode 28, 30 then has a maximum voltage drop across its respective leads of only about one-half the total voltage (i.e., 9 volts in the example) which is below the threshold. Therefore, each zener diode remains an effective open circuit.

Activating telephone 10 by taking it off hook closes the circuit between its respective leads 40 and 42, which effectively closes a series circuit from battery 26 through line 18, telephone 10, battery 24, and line 16. Since the combined voltage of both batteries in series is approximately 18 volts, and since the voltage drops across telephone 10 and beeper 30 are only a few volts, the voltage drop occurring across the terminals of zener diode 30 exceeds its threshold and is sufficient to cause zener diode 30 to become conductive, thereby drawing current through beeper 34 to make it operative.

Therefore, when telephone 10 is taken off hook, signalling beeper 34 begins to operate and continues to operate until either (a) telephone 10 is deactivated, i.e., hung up, or (b) telephone 12 is answered. Taking telephone 12 off hook closes the circuits between its leads 44 and 46. This deactivates beeper 34 and lets both activated telephones operate in a normal manner, being powered by the combined voltages of dc sources 24 and 26 until communications are complete and the telephones are both hung up.

Figure 2:
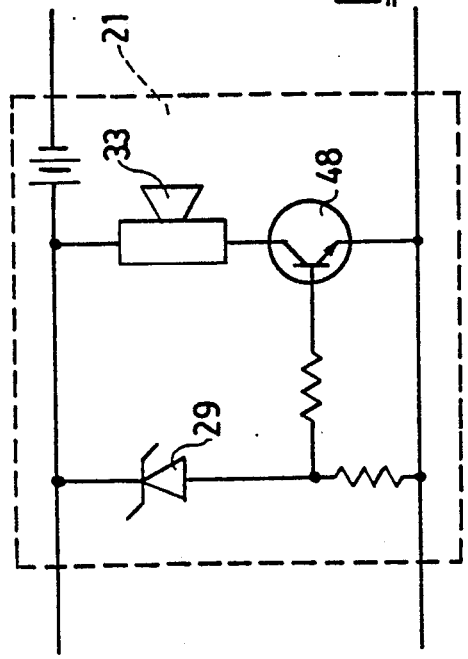
FIG. 2 is a schematic diagram of a slightly modified version of the signalling units shown in FIG. 1.

FIG. 2 shows modified signalling unit 21 which has a slightly more complex, but still relatively simple, variation of the signalling circuit. This variation still includes a zener diode 29 as the threshold element and a beeper 33 as the signalling device. However, in this variation, beeper 33 does not operate on the same current passed by zener diode 29. Instead, the conduction of the threshold element 29 results in conduction of a transistor 48 which activates beeper 33.

Figure 3:
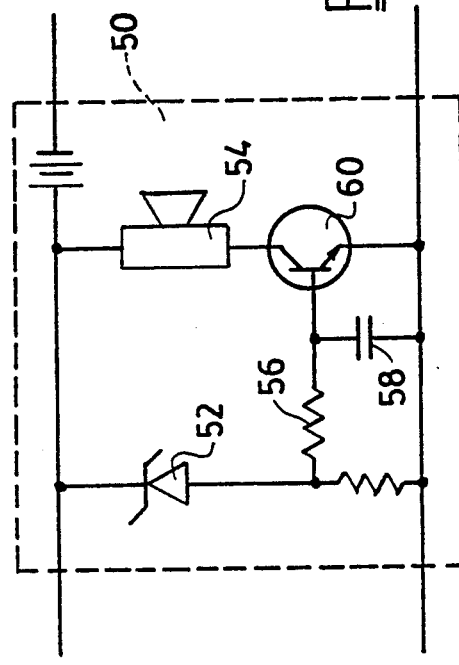
FIG. 3 is a schematic diagram of another modified version of the signalling units shown in FIG. 1, this modification including a timing circuit for delaying operation of the signalling device.

While the just-described embodiments include a separate battery in each signalling unit, the invention will function as well if the two separate batteries are replaced by a single battery or if an external dc power source is provided in series with the phones. Further, although the above-described signalling circuits are remarkably simple, it will be noted that whichever of the two telephones is hung up first following completion of communication causes its associated buzzer to ring again until the other telephone is also hung up. Since this momentary buzzer operation may not be desirable in some circumstances, it can be avoided by the alternative circuit arrangement illustrated in FIG. 3 in which a modified signalling unit 50 still includes a threshold element in the form of a zener diode 52 and a signalling device in the form of a beeper 54. However, in this modified circuit, the operation of beeper 54 is delayed by a timing circuit comprising resistance 56, capacitor 58, and transistor 60, the characteristics of these circuit components being selected in a manner well known in the art to provide an appropriate delay (e.g., two seconds) before the voltage appearing at the base of transistor 60 is sufficient to cause its conduction and the operation of beeper 54. Therefore, when zener diode 52 initially becomes conductive (in response to its associated telephone being on-hook at a time when the other telephone is off-hook, as explained above), beeper 54 will not operate during the preselected time delay, thereby permitting time for both phones to be hung up.

When a phone is taken off hook and initiates operation of the beeper associated with the second phone, the operation of the beeper can be heard in the earpiece of the first phone. That is, the caller can verify that the second phone's beeper is operating by merely listening at his own phone.

Thus, the invention provides a two-telephone intercom in which the activation of one telephone automatically causes a station-call signal to operate at the other. It is possible to organize this automatic signalling system as a pair of compact signal units that include the dc power sources for the telephones as well as the necessary signalling devices in a remarkably inexpensive and simple circuit arrangement.

I claim:

1. A telephone intercom comprising a pair of selectively activated telephones interconnected by a pair of wires, said telephones being in series with each other and in series with a dc power source, and each said telephone being connected in parallel with a circuit comprising a voltage-sensitive threshold element and a signalling device so that, when a first one of said telephones is activated, closing its circuit to said dc power source, the total voltage of said power source is applied to a series circuit that includes the threshold element associated with the other telephone, causing the latter threshold element to conduct and operate its associated signalling device.

2. The telephone intercom according to claim 1 wherein said voltage-sensitive threshold element is a zener diode.

3. The telephone intercom according to claim 1 wherein said signalling device is a beeper.

4. The telephone intercom according to claim 1 wherein the circuit connected in parallel with each said telephone further comprises a timing circuit for delaying operation of said signalling device.

5. In a telephone intercom having a pair of selectively activated telephones connected in series with each other and a dc power source over a pair of wires, the improvement comprising, a pair of signalling circuits, each associated, respectively, with one of said telephones and having a voltage-sensitive threshold element and a signalling device, each said signalling circuit being (a) connected in parallel with its associated telephone and (b) positioned between said associated telephone and said power source so that, whenever its associated telephone is selectively activated, said power source is placed in series with the signalling circuit associated with the other telephone to cause the conduction of the other telephone's threshold element and the operation of its respective signalling device until the other telephone is also activated.

6. The telephone intercom according to claim 5 wherein said dc power source comprises a pair of batteries and each said signalling circuit is positioned in physical proximity to its associated telephone and a respective one of said batteries.

7. The telephone intercom according to claim 6 wherein each said proximately positioned signalling circuit and battery form the components of a respective unitary signalling unit.

8. The telephone intercom according to claim 5 wherein each said signalling circuit further comprises a timing circuit for delaying the operation of its respective signalling device.

9. A telephone intercom comprising:
   a pair of selectively activated telephones in series circuit with a pair of connecting wires;
   a dc power source in series with both said telephones; and
   a pair of signalling circuits,
      each signalling circuit having a voltage-sensitive threshold element and a signalling device,
      each signalling circuit being connected in parallel across said connecting wires between said power source and an associated one of said telephones, and
      each signalling circuit becoming conductive to operate its respective signalling device whenever its associated telephone is deactivated and the other telephone is selectively activated.

10. The telephone intercom according to claim 9 wherein, if the signalling device of one of said signalling circuits is operating in response to the selective activation of the other telephone, activation of its associated telephone will cause said operating signal circuit to cease conducting and its signalling device to become inoperative.

11. The telephone intercom according to claim 9 wherein, when both said telephones are deactivated, both said signalling circuits are in series with said power source and the voltage drop across said signalling circuits does not exceed the threshold for causing either of said threshold elements to become conductive.

12. The telephone intercom according to claim 9 wherein said threshold element is a zener diode.

13. An automatically operable signalling system for a telephone intercom having a pair of selectively activated telephones connected in series by a double-wire conductor, said signalling system comprising:

a signalling unit associated with each telephone;

each unit having (a) a dc power source and (b) a signalling circuit with a zener diode in series with a signalling device; and each unit being connected to its associated telephone with (i) its power source in series with the telephone and (ii) its signalling circuit in parallel with the telephone and located between its power source and the telephone.

14. The signalling system of claim 13 wherein each said signalling unit is physically positionable in proximity to its associated telephone.

15. The signalling system of claim 13 wherein each said signalling device is a beeper.

16. The signalling system of claim 13 wherein each said dc power source is a 9-volt battery and the junction break-down voltage of each said zener diode is 12 volts.

* * * * *